United States Patent
Fowler et al.

(10) Patent No.: US 9,934,415 B1
(45) Date of Patent: Apr. 3, 2018

(54) HANDHELD READER HAVING TRANSPARENT CIRCUIT BOARD FOR ALIGNMENT OF MULTIPLE ELECTRICAL CONTACTS

(71) Applicant: XEROX CORPORATION, Norwalk, CT (US)

(72) Inventors: Jeffrey M. Fowler, Rochester, NY (US); Michael A. Doody, Manchester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/492,678

(22) Filed: Apr. 20, 2017

(51) Int. Cl.
*G06K 7/10* (2006.01)
(52) U.S. Cl.
CPC ..... *G06K 7/10881* (2013.01); *G06K 7/10732* (2013.01)
(58) Field of Classification Search
USPC ............. 235/462.45, 462.49, 472.01–472.03
See application file for complete search history.

(56) References Cited

U.S. PATENT DOCUMENTS

| | | | | |
|---|---|---|---|---|
| 4,680,141 A * | 7/1987 | Barajas | ................ | B23K 35/025 252/500 |
| 5,148,009 A * | 9/1992 | Lindacher | .......... | G06K 7/10871 235/462.45 |
| 5,148,103 A | 9/1992 | Pasiecznik, Jr. | | |
| 5,583,445 A | 12/1996 | Mullen | | |
| 6,045,047 A * | 4/2000 | Pidhirny | ............ | G06K 7/10811 235/454 |
| 6,065,676 A * | 5/2000 | Ring | ................... | G06K 7/10693 235/462.32 |
| 6,270,013 B1 * | 8/2001 | Lipman | .............. | G06K 7/10881 235/454 |
| 6,523,920 B2 * | 2/2003 | Wade | ................... | B41J 2/17553 347/19 |
| 7,009,141 B1 * | 3/2006 | Wool | ................. | B23K 26/0096 219/121.73 |
| 7,614,563 B1 * | 11/2009 | Nunnink | ............ | G06K 7/10732 235/462.42 |
| 8,184,467 B2 | 5/2012 | Broms et al. | | |
| 2002/0000471 A1 * | 1/2002 | Aasmul | ................... | G06K 1/121 235/462.45 |
| 2003/0206150 A1 * | 11/2003 | Hussey | .............. | G06K 7/10851 345/156 |

(Continued)

OTHER PUBLICATIONS

Xerox Corporation, "Xerox Printed Memory with Cryptographic Security," product brochure, 2015, 4 pages.

(Continued)

*Primary Examiner* — Tuyen K Vo
(74) *Attorney, Agent, or Firm* — MH2 Technology Law Group LLP

(57) ABSTRACT

A portable reader for performing an operation on an integrated circuit (IC) such as a printed memory. The portable reader comprises a body and a transparent head. The head is sufficiently transparent that the IC is visible through the transparent head. By detecting the IC through the transparent head, the portable reader may be aligned with the IC, and a contact module on the portable reader may be aligned and electrically coupled with contact pads on the IC.

20 Claims, 6 Drawing Sheets

(56) References Cited

U.S. PATENT DOCUMENTS

2014/0330205 A1* 11/2014 Tian .................... A61M 5/1411
604/151

OTHER PUBLICATIONS

Xerox Corporation, "Xerox Launches Printed Memory Products to Combat Counterfeiting," news release, Sep. 15, 2015—Innovation Research, 2 pages.
Author Unknown, "DIY Trade Global B2B Trading Platform—Transparent flexible circuit board," http://www.diytrade.com/china/pd/12212123fTransparent_flexible_circuit_board.html, date unknown, 4 pages.
Author Unknown, "Shin ETSU—GB-E Type Interconnector," product description, http://www.shinpoly.com/products/interconnectors/gb_e01.shtml, date unknown, 2 pages.

* cited by examiner

HANDHELD READER HAVING TRANSPARENT CIRCUIT BOARD FOR ALIGNMENT OF MULTIPLE ELECTRICAL CONTACTS

TECHNICAL FIELD

The present teachings relate to the field of integrated circuits and product marking, for example, products including a tag or label for authentication and/or inventory control and, more particularly, to readers and scanners for reading and/or writing data from/to a product marked with an electronic memory, tag, or label.

BACKGROUND

Xerox Printed Memory is a highly secure printed label including rewritable memory. In one exemplary use, the labels may be used for authentication to determine whether a product is genuine to prevent counterfeiting. For example, the printed memory may be included as a subassembly of a customer-replaceable unit such as various consumable components, supplies, shipment packaging, consumer products, documents, etc. The printed memory may be read, for example, after installation of the unit into a host device and compared to an expected value. If the value read from the printed memory matches the expected value, circuitry within the host device allows the host device to function. If the value read from the printed memory does not match the expected value, the circuitry disables functionality of the host device until an authentic unit is installed.

In another implementation, Xerox Printed Memory may be used to track a product through a manufacturing process and/or a supply chain. The labels can be programmed to mark individual items with a unique electronic identifier that may be verified with a scanner. Other uses for Xerox Printed Memory are contemplated including, but not limited to, smart consumables where an object is associated with data that is later used by a base unit to improve or optimize performance, consumption records where bulk usage of a product supply is tracked, tracking of items or people outside of an manufacturing environment, etc.

A Xerox Printed Memory includes a layer of ferroelectric or ferrite material (i.e., a ferroelectric layer) positioned between a plurality of wiring lines (e.g., word lines and bit lines). A region of the ferroelectric layer situated between each bit line and word line forms a memory cell. The memory may be written with one of two digital memory states by applying a suitable write voltage to the wiring lines. The memory state may be read by applying a suitable read voltage to the wiring lines.

Various manufacturing processes may be used to form the ferroelectric material. Depending on the manufacturing process used, the printed memory device will display particular electrical characteristics. For example, for a given read voltage, different compositions of the ferroelectric layer return different output values. The manufacture and composition of the memory itself is difficult to counterfeit and provides secure and reliable anti-counterfeiting measures and reliable product tracking.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation according to the present teachings, a portable reader may include a reader body having a housing and electronic circuitry within the housing. The portable reader may further include a transparent reader head connected to the reader body and having a first side and a second side opposite the first side, the transparent reader head further including a contact module electrically coupled with the electronic circuitry within the housing and configured to establish simultaneous electrical connection to a plurality of contact pads. The transparent reader head may be configured such that an integrated circuit at the second side of the transparent reader head is visible from the first side of the transparent reader head.

In another implementation, a portable reader may include a reader body having a housing, a system board with electronic circuitry within the housing, and a connector socket attached to the system board. The portable reader may further include a transparent reader head connected to the reader body and having a first side and a second side opposite the first side. The transparent reader head may further include an outer nose having a cavity formed by the outer nose, an inner nose positioned within the cavity, and a contact module electrically coupled with the electronic circuitry within the housing and configured to establish simultaneous electrical connection to a plurality of contact pads. The transparent reader head may be configured such that an integrated circuit at the second side of the transparent reader head is visible from the first side of the transparent reader head.

In another implementation, a method for performing an operation on an integrated circuit may include activating a detector switch on a portable reader, visually detecting the integrated circuit through a transparent head of the portable reader, aligning a contact module of the transparent head with the integrated circuit while visually detecting the integrated circuit through the transparent head, electrically coupling the contact module with integrated circuit contact pads, and performing the operation on the integrated circuit while electrically coupling the contact module with the integrated circuit contact pads.

BRIEF DESCRIPTION OF THE DRAWINGS

The accompanying drawings, which are incorporated in and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever possible, the same reference numbers will be used throughout the drawings to refer to the same or like parts.

Figure 1:
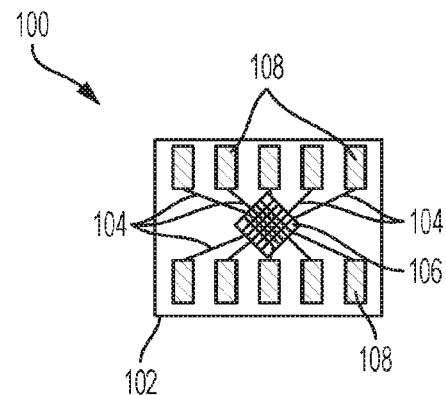
FIG. 1 is a plan view of an integrated circuit (IC), for example, a printed memory such as a Xerox Printed Memory.

An example of an integrated circuit (IC) 100, for example, a printed memory 100 such as a Xerox Printed Memory 100 is depicted in the plan view of FIG. 1. The structure and function of the Xerox Printed Memory 100 is known, and is only briefly discussed herein. The FIG. 1 device 100 includes a substrate 102, for example, a flexible polymer substrate 102 that may include an adhesive layer 808 (FIG. 8) to aid in attachment of the device 100 to a surface of a product 806 (FIG. 8), a plurality of wiring lines (e.g., word lines and bit lines) 104 and a ferroelectric layer 106 directly interposed or positioned between the word lines and the bit lines. A memory cell that stores the logic bit or logic state is provided by and within the ferroelectric layer 106 at the physical location that is interposed between the intersection of each word line and bit line. It will thus be appreciated that the word lines and bit lines do not physically intersect, but are physically separated by the ferroelectric layer. The printed memory 100 of FIG. 1 includes 10 wiring lines 104 (five word lines and five bit lines), and thus the FIG. 1 device 100 includes 25 memory cells and may thus store 25 bits of information. Each wiring line 104 terminates in a contact pad 108. It will be appreciated that a Xerox Printed Memory may include other structures that are not described or depicted for simplicity, while various depicted structures may be removed or modified. Each memory cell of the printed memory 100 may be read by applying a suitable read voltage to two of the wiring lines 104 (i.e., to one word line and one bit line) and measuring an electrical response. To apply the read voltage, the plurality of contact pads 108 are physically and electrically contacted with probe contacts. A voltage is applied across the contact pads through probe contacts, and the resulting response is measured. Each memory cell may individually addressed during a read or write cycle, and two or more, or all, of the memory cells in the memory array may be read or written simultaneously or serially.

A printed memory 100 may include up to 10 contact pads 108, or more, depending on the design. Each of the contact pads 108 are relatively small, with current designs having dimensions of about 1.5×3.0 millimeters (mm). Each contact pad 108 is spaced from an adjacent contact pad 108 by about 1 mm. Further, the probe contacts must properly align and maintain physical and electrical contact with each of the contact pads during an entire read or write cycle of the printed memory 100. Moreover, the size and shape of products to which a printed memory label is attached may vary (for example, as the size and shape of different medicine containers vary in a pharmacy). Depending on the placement of the printed memory label and configuration of the product, establishing electrical contact with each of the contact pads 108 during a memory operation such as a read cycle or a write cycle may be difficult. Additionally, the printed memory may be placed onto a package manually by an operator, and precise alignment to the printed memory 100 with automated equipment may not be possible. Further, depending on labor costs, automated equipment using optical systems to achieve proper alignment may be more expensive than employing a human operator.

An implementation of the present teachings provides a portable handheld reader that may be used with Xerox Printed Memory 100. The handheld reader may increase the likelihood of establishing electrical contact with the printed memory contact pads 108 during a memory operation, for example, when used by a human operator. The reader may perform one or more IC operations relative to an IC including, but not limited to, read functions, write functions, test functions, and/or one or more other IC operations.

Figure 2:
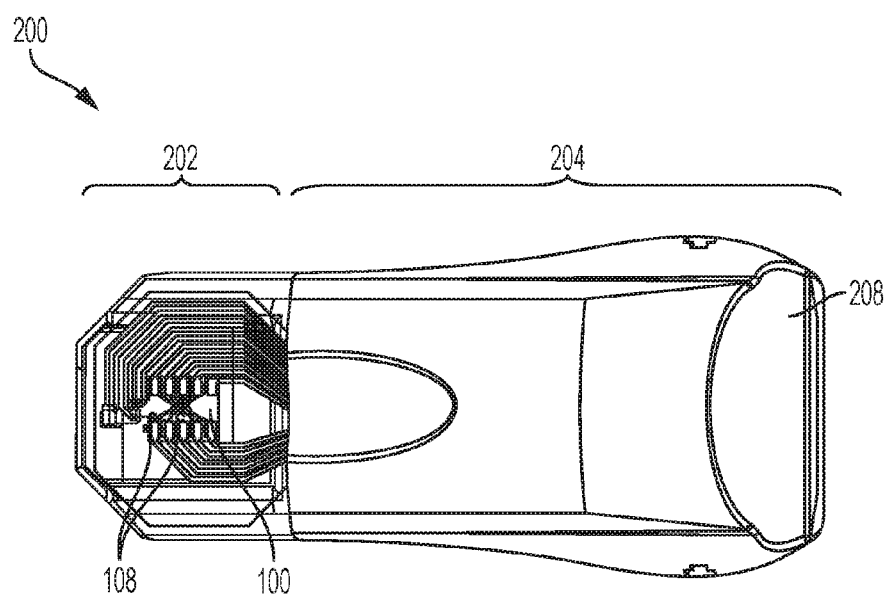
FIG. 2 is a perspective top view of portable reader in accordance with an implementation of the present teachings that may be used to perform an operation such as a read and/or write operation on the IC of FIG. 1.
Figure 3:
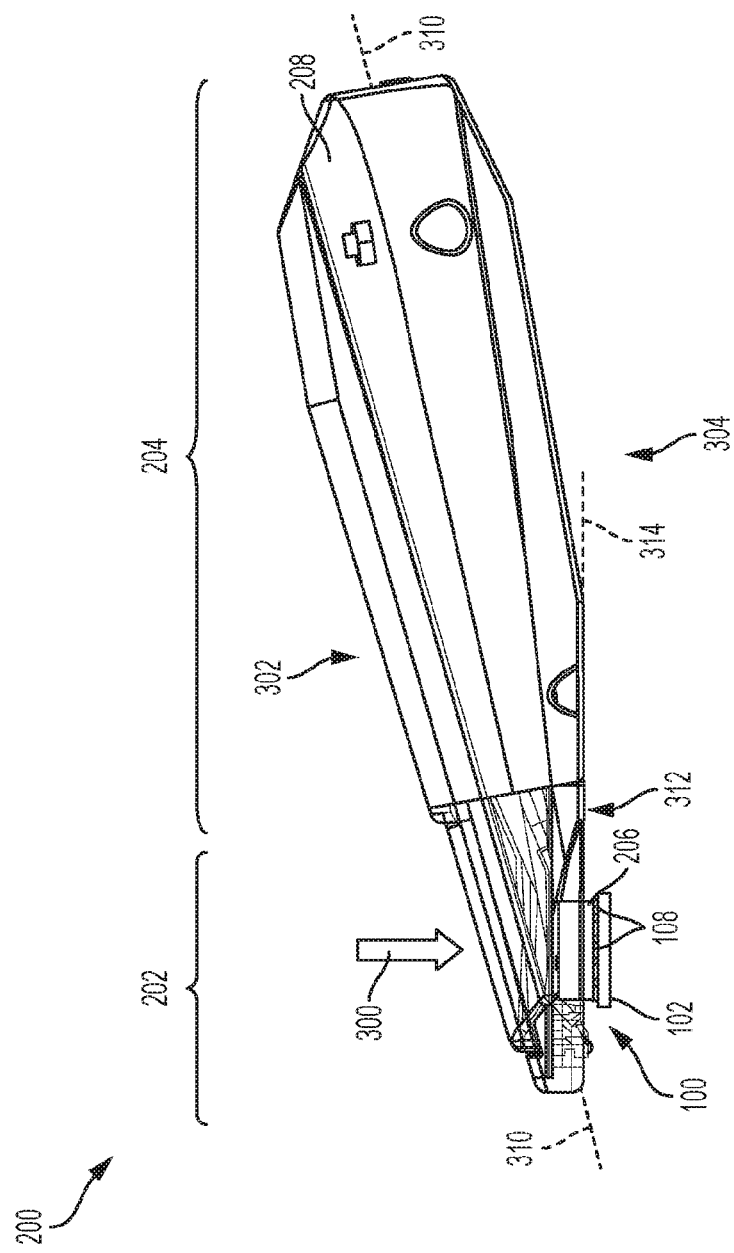
FIG. 3 is a perspective side view of the portable reader of FIG. 2.

FIG. 2 is a top view, and FIG. 3 is a side view, of a reader 200 such as a handheld portable reader 200 in accordance with one implementation of the present teachings. FIGS. 2 and 3 depict the reader 200 in contact with a printed memory 100 during, for example, a memory operation. In this implementation, the reader 200 includes a head section (i.e., head, reader head, or transparent reader head) 202 connected to a body section (i.e., body or reader body) 204 using, for example, one or more fasteners such as slots and deformable tabs, or another fastener (not individually depicted for simplicity). The head 202 includes a contact module 206 that, during an operation such as a memory operation, physically and electrically contacts printed memory contact pads 108 on the printed memory 100. During the memory operation, an operator may grasp the body 204 of the reader 200 and direct the head 202 to the IC 100. Various implementations of the contact module 206 are contemplated, some of which are described below and depicted herein. The body 204 includes a housing 208 that encloses various device components as described below. The reader 200 may have a longitudinal axis 310 extending through the reader 200 from an end of the head section 202 to an end of the body section 204. The reader 200 may also include a planar surface (e.g., a planar lower surface) 312 from which the contact module 206 extends, where a plane 314 of the lower surface 312 intersects the longitudinal axis 310 at or toward the head section 202 end of the reader 200.

Various components of the head section 202 may be transparent to visible light, which may allow an operator to more easily align the contact module 206 with the contact pads 108 of the printed memory 100 compared to readers that are translucent or opaque. For purposes of this disclosure, when referring to head section 202, "transparent" or "sufficiently transparent" specifies that the head 202 is sufficiently clear, transparent, or translucent to allow an operator to visually detect and align the contact pads 108 of the printed memory 100 to the contact module 206 through the head section 202 of the reader 200, for example, in the direction of arrow 300 of FIG. 3. It will be understood that the transparent reader head may include structures that are not transparent. As depicted in FIG. 3, the reader includes a first (i.e., upper) side 302 and a second (i.e., or lower) side 304. During use, the contact module 206 on the lower side 304 of the reader that extends from the lower surface 312 may physically and electrically contact the printed memory 100. An operator may align the contact module 206 with the printed memory 100 by observing the position of the contact module 206 relative to the IC contact pads 108, and adjusting the position of the printed memory 100 and/or the reader 200 for proper alignment.

Figure 4:
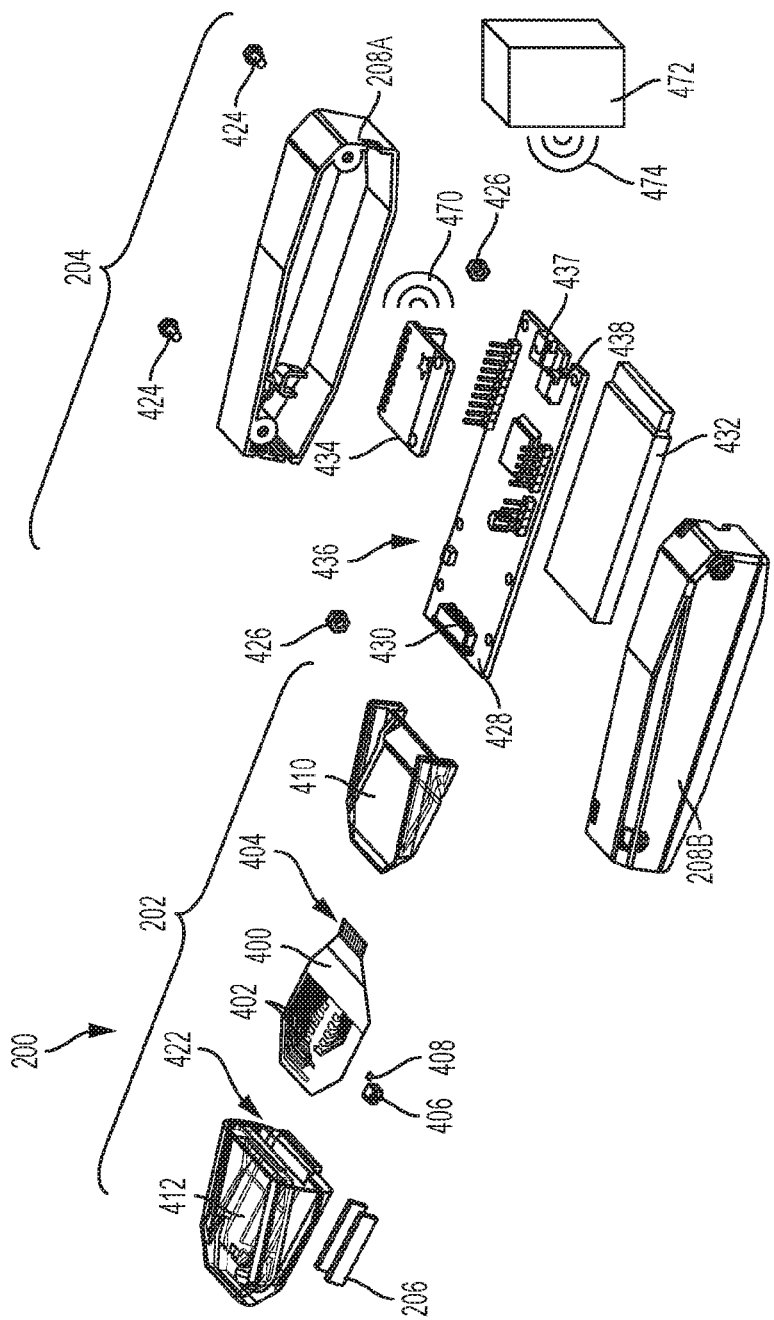
FIG. 4 is an exploded perspective depiction of a portable reader in accordance with an implementation of the present teachings.

FIG. 4 is an exploded perspective depiction of a reader 200 in accordance with an implementation of the present teachings. It will be understood that, in some implementations of the present teachings, a reader may include other structures and/or features that have not been depicted for simplicity, while various depicted structures and/or features may be removed or modified. As depicted in FIG. 4, the head section 202 may include a circuit board 400 such as a flexible circuit board (FCB) 400 having conductive traces 402 thereon that may terminate at an edge connector 404 of the FCB 400. A detector switch 406 and a light source 408 such as one or more light emitting diodes (LED) 408 may be electrically coupled to, and powered through, the conductive traces 402. The head 202 may further include an inner nose 410 and an outer nose 412 wherein, after assembly, the FCB 400 is positioned within the head 202 between the inner nose 410 and the outer nose 412. The inner nose 410, the outer nose 412, and the FCB may be transparent (i.e., include at least some structures that are transparent) to visible light, such that an operator to more easily align the contact module 206 with the contact pads 108 of the printed memory 100 compared to readers that are translucent or opaque. In an implementation, the inner nose 410 may be inserted into, and received by, a cavity 422 formed by the outer nose 412, such that the FCB 400 is positioned between, and held in place by, the inner nose 410 and the outer nose 412. The edge connector 404 of the FCB 400 may extend from the head section 202 to provide access to the edge connector 404.

As depicted in FIG. 4, the housing 208 of the body section 204 may include a first housing portion 208A that mechanically connects to a second housing portion 208B using one or more fasteners such as screws 424 and nuts 426. The housing 208 may enclose and protect various electronic components and subsystems as depicted. The body section 204 may further include a system board 428 that is designed and manufactured to perform various system operations as described herein. The system board 428 may include a connector socket 430 that receives, and is electrically coupled with, the edge connector 404 of the FCB 400 that extends from the head section 202, and thus the connector socket 430 is electrically coupled to the traces 402. The system board 428, FCB 400, and other electronic components may be powered by a battery 432 such as a rechargeable lithium polymer (LiPo) battery 432 that is electrically coupled to the system board 428 and sized to power the reader 200 for a desired duration of time. The reader 200 may further include a wireless module or transceiver 434 such as a Bluetooth® wireless module 434 that is configured to transmit or upload a wireless output or data 470 regarding the printed memory to an information processing system 472 such as a computer server or other computer host device for analysis or testing. The transceiver 434 may further download a wireless output or data 474 relative to testing, firmware, etc., sent from the information processing system 472 for use by the reader 200.

The system board 428 may include passive and active electronic circuitry 436 including, for example, a microprocessor, memory, and logic devices. The circuitry 436 may further include conductive traces or interconnects that are electrically coupled to each of the electronic components, and pass power, data, and/or operational signals to, from, and/or between the electronic components. The system board 428 may further include other structural and electronic features to support operation, for example, a data port 437 that allows data to be imported and exported to and through the system board 428 and a power port 438 for recharging the battery 432. The reader 200 may include other components such as a camera configured to capture one or more indicia such as a barcode, and a user interface such as a display (not individually depicted for simplicity).

Figure 5:
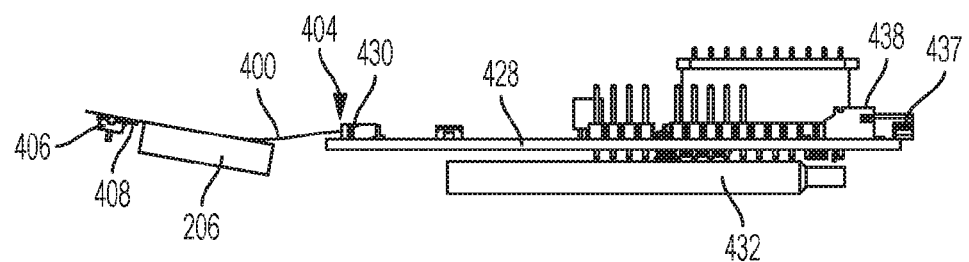
FIG. 5 is a side view depicting electronic circuitry within a portable reader according to an implementation of the present teachings.

FIG. 5 is a side view depicting components of the reader 200 with the edge connector 404 of the FCB 400 inserted into the connector socket 430 on the system board 428 and the contact module 206 physically and electrically coupled to the FCB 400. The FIG. 5 depiction excludes the housing 208, the inner nose 410, and the outer nose 412. The connector socket 430 is electrically coupled to the circuitry 436 of the system board 428, and thus signals, data, etc., are transferred between the FCB 400 and the circuitry 436 through the connector socket 430.

Figure 6:
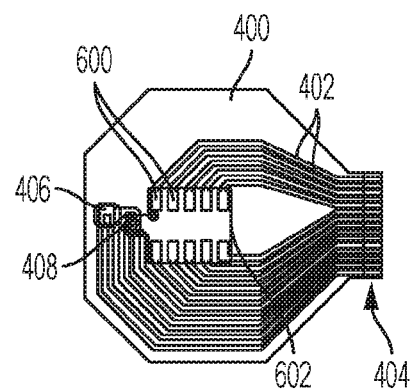
FIG. 6 is a plan view of a flexible circuit board within a portable reader according to an implementation of the present teachings.
Figure 8:
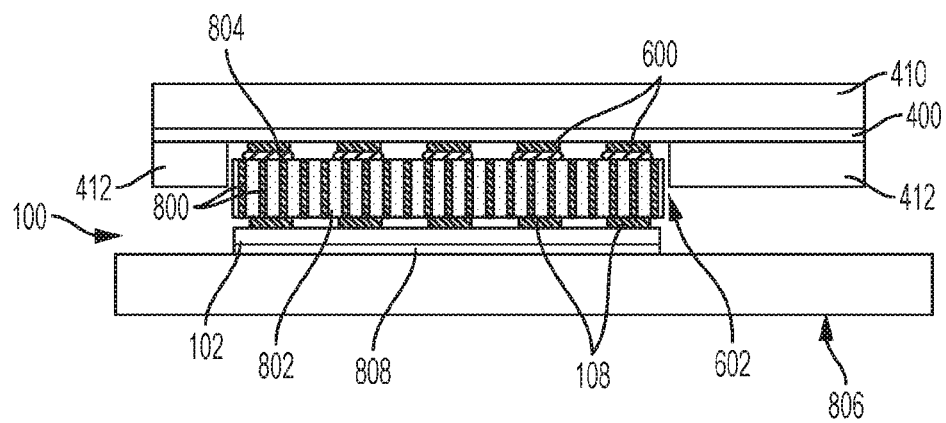
FIG. 8 is a cross section depicting a contact module in accordance with an implementation of the present teachings.

FIG. 6 is a plan view depicting a lower side 304 (referring to the orientation of FIG. 3) of the FCB 400. The traces 402 may terminate in trace pads 600 that facilitate electrical coupling of the contact module 206 with the traces 402. FIG. 6 further depicts one or more openings 602 defined by the outer nose 412 that exposes the trace pads 600 through the outer nose 412 such that the contact module 206 may be electrically coupled to the trace pads 600 and the traces 402, for example, as depicted in FIG. 8 and described below. The opening 602 may also expose the LED 408.

Referring back to FIG. 4, after assembly of the reader 200, the FCB 400 is positioned between, and held in place by, the inner nose 410 and the outer nose 412. The conductive trace pads 600 of the traces 402 on the lower side of the FCB 400 are exposed through the one or more openings 602 defined by the outer nose 412. The contact module 206 extends through the opening 602 and may be electrically coupled with the traces 402 using an electrical conductor 804 (FIG. 8), for example, solder, a pin and/or socket structure, or another electrical conductor. The contact module 206 thus may physically and electrically contact the contact pads 108 of the FCB 400.

Figure 7:
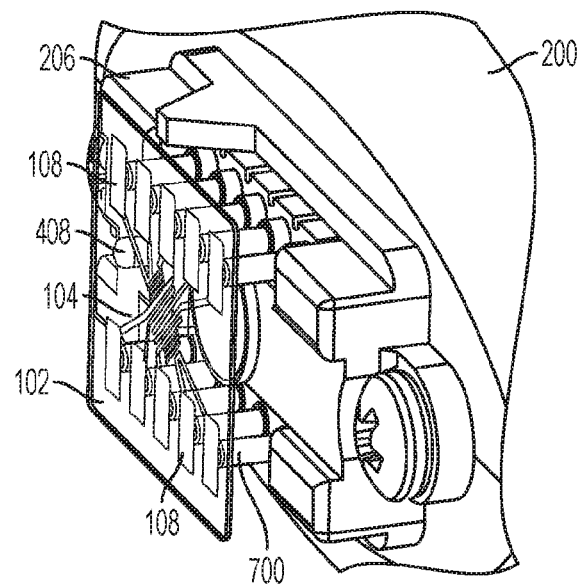
FIG. 7 is a perspective depiction of a contact module in accordance with an implementation of the present teachings.

Various configurations or implementations of the contact module 206 that allow temporary physical and electrical contact between the contact module 206 and the printed memory 100 are contemplated. For example, FIG. 7 is a schematic perspective depiction of the contact module 206 including a plurality of spring-loaded pins 700, commonly referred to as Pogo® pins or Pogo probes. FIG. 7 depicts the contact module 206, specifically the spring-loaded pins 700, in physical and electrical contact with the contact pads 108 of the printed memory 100.

FIG. 8 is a schematic cross section depicting a compression-type interconnect including a plurality of filaments 800, for example, a plurality of parallel electrically conductive filaments 800, laterally encased in a flexible dielectric material 802 such as silicone rubber that forms the contact module. The FIG. 8 contact module may be, for example, a GB-E type inter-connector available from Shin-Etsu Polymer America, Inc. of Newark, Calif. As depicted in FIG. 8, first ends of the filaments 800 are electrically coupled with the trace pads 600. Electrical contact may be established through physical contact between the filaments 800 and the trace pads 600 without use of a separate conductor. In another implementation, electrical contact may be established using a separate electrical conductor 804, for example, solder pads 804 or another electrical conductor. As depicted in FIG. 8, a second end of the filaments 800 physically and electrically contact the contact pads 108 of the printed memory 100. Signals and/or data may be transferred between the trace pads 600 and the contact pads 108 through the filaments 800. The contact module 206 allows for substantial misalignment between the contact module 206 and the IC 100 while still providing sufficient electrical contact therebetween. FIG. 8 further depicts a surface of the substrate 102 of the printed memory 100 attached to a product 806 using an adhesive layer 808. As discussed herein, the printed memory 100 may be used for inventory tracking and/or control, for anti-counterfeiting and/or authentication, or for other uses.

Figure 9:
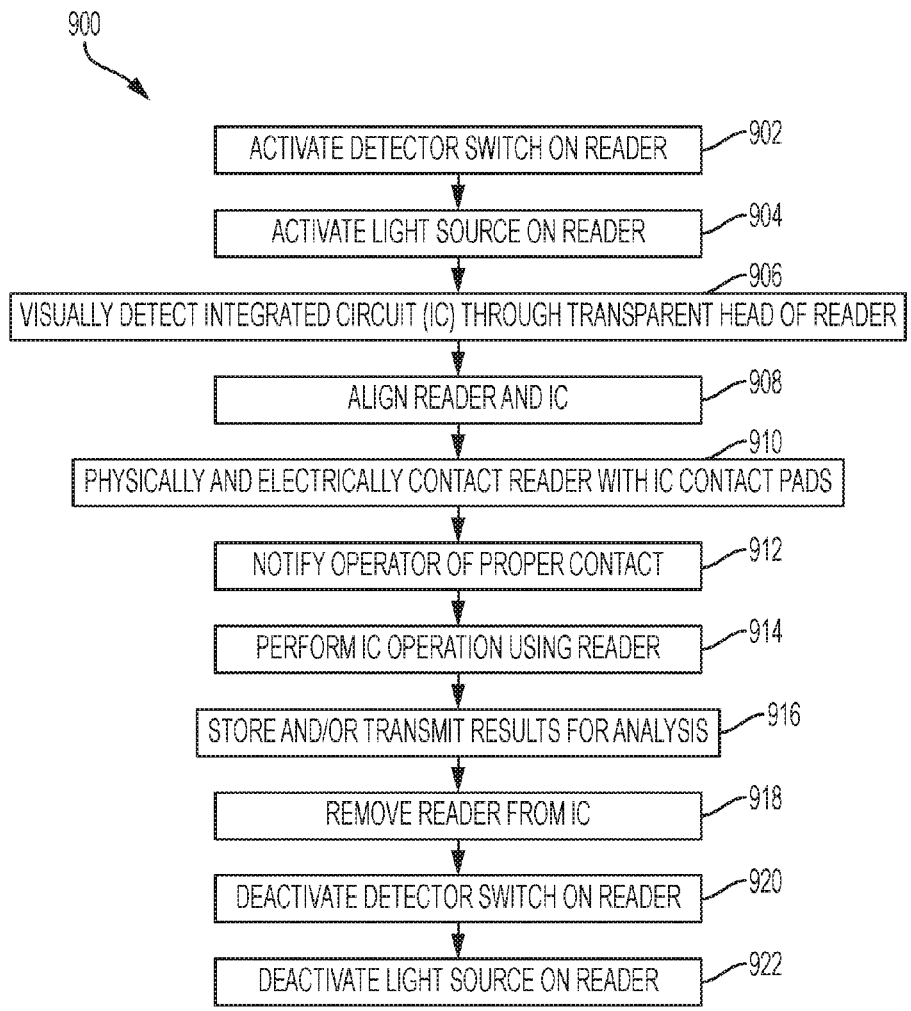
FIG. 9 is a flow chart or flow diagram depicting a process for performing an operation, for example, a read and/or write operation on an IC in accordance with an implementation of the present teachings.

A method or process 900 for performing an operation such as a read operation, a write operation, a functional test operation, a characterization test operation, or another operation on an IC 100 such as a Xerox Printed Memory 100 is depicted in the flow diagram of FIG. 9. The method 900 may proceed by operation or use of one or more of the structures depicted in the figures described above, and thus is described with reference to FIGS. 1-8; however, it will be appreciated that the method 900 is not limited to any particular structure or use unless expressly stated herein. It will be appreciated that while the method 900 is described as a series of acts or events, the present teachings are not limited by the ordering of such acts or events. Some acts may occur in different orders and/or concurrently with other acts or events apart from those described herein. Further, a method in accordance with the present teachings may include other acts or events that have not been depicted for simplicity, while other depicted acts or events may be removed or modified.

In an implementation, the process 900 may begin by activating an optional light source 408 such as an LED 408 as at 902 to direct light onto the printed memory 100 and/or product 806 to assist an operator in aligning the reader 200 to the printed memory 100. The light source 408 may be manually activated by an operator, may activate automatically using a proximity detector, or may be activated using another technique. Next, as depicted at 904, an operator may visually detect the printed memory 100 through the transparent head 202 of the reader 200, for example, through the transparent outer nose 412, inner nose 410, and FCB 400. The contact module 206 of the reader 200 is aligned by the operator with the plurality of contact pads 108 of the printed memory 100 as at 906. The contact module 206 of the reader 200 is then physically and/or electrically contacted or coupled to the contact pads 108 of the printed memory 100 as at 908. The detector switch 406 may be activated upon placing the contact module 206 in electrical contact with the contact pads 108. For example, the detector switch 406 may be a pressure switch that is activated when axial pressure is applied to the contact module 206, for example, if the contact module 206 includes the use of spring-loaded pins 700. Other types of detector switches 406 are contemplated, for example, a continuity switch 406 that activates when electrical continuity through the contact module 206 has been detected.

Once proper physical and electrical contact between the contact module 206 and the contact pads 108 is made, the reader 200 initiates and performs the operation on the printed memory 100 as at 912. Optionally, once proper physical and electrical contact has been made or established and the IC operation has been performed, a visual or audible signal may be generated by, and emitted from, the reader 200 to notify the operator of the status of the IC operation as at 914. For example, the notification at 914 may indicate that electrical contact of the contact module 206 with the contact pads 108 has been successful and/or that the IC operation has been successfully completed. In some implementations, an operator may be notified of one or more other status conditions of the IC operation, for example, proper electrical contact can be made but the IC cannot be read, the IC can be read but the contents are invalid, the memory contents have been read and are valid, the memory contents have been successfully updated, etc. This information may be conveyed to the operator, for example, by flashing the light from the light source 408, by manipulating the color of the light from the light source 408, using lights from one or more light sources situated elsewhere in the reader, by emitting auditory signals from an electronic buzzer or beeper, by providing haptic feedback (e.g., tactile signals such as buzzer or vibrational patterns) from the reader 200, through one or more display screens, etc.

The reader 200 may store results of the operation locally in memory on the reader 200 for later uploading to, for example, an information processing system 472 such as a computer server or other host device, or the results may be transmitted to the information processing system 472 using, for example, the transceiver 434 to transmit the data 470 as at 916. The information processing system 472 may, for example, analyze the data 470 including results of a read cycle to determine whether the IC, and thus the product 806 to which the IC is attached, is authentic or counterfeit. The information processing system 472 may return data 474 including the analyzed results to the transceiver 434 of the reader 200. The operator may then be notified whether the product is authentic or counterfeit, for example, by a visual or audible signal output by the reader 200. Upon completion of the operation at 912 and notification of the operator as at 914, the operator may remove the reader 200 from the IC 100 as at 918, which may result in deactivation of the detector switch 406 as at 920 and the light source 408 as at 922. The process 900 may then be repeated on another printed memory 100 or other IC 100.

The transparent head 202 of the reader 200 thus simplifies the alignment of the reader 200 to the IC 100 by allowing the operator to see, visually detect, and/or optically detect the IC 100 through the head 202 of the reader 200.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A portable reader, comprising:
    a reader body, comprising:
        a housing; and
        electronic circuitry within the housing; and
    a transparent reader head connected to the reader body and comprising a first side and a second side opposite the first side, the transparent reader head further comprising a contact module electrically coupled with the electronic circuitry within the housing and configured to establish simultaneous electrical connection to a plurality of contact pads,
    wherein the transparent reader head is configured such that an integrated circuit at the second side of the transparent reader head is visible from the first side of the transparent reader head.

2. The portable reader of claim 1, further comprising a transparent circuit board within the transparent reader head, wherein transparent circuit board comprises circuitry that is electrically coupled to the contact module.

3. The portable reader of claim 2, wherein:
    the transparent circuit board further comprises an edge connector; and
    the reader body further comprises a connector socket that receives, and is electrically coupled with, the edge connector.

4. The portable reader of claim 2, wherein the transparent reader head further comprises:
    an outer nose comprising a cavity formed by the outer nose; and
    an inner nose positioned within the cavity,
    wherein the transparent circuit board is positioned between, and held in place by, the inner nose and the outer nose.

5. The portable reader of claim 1, wherein the transparent reader head further comprises at least one of:
    a detector switch configured to activate as the portable reader is placed into electrical contact with a surface; and
    a light source configured to activate and to direct light onto the surface.

6. The portable reader of claim 1, further comprising a transceiver configured to transmit data regarding the integrated circuit to an information processing system and/or to receive data from the information processing system for use by the portable reader.

7. The portable reader of claim 1, wherein the contact module comprises a plurality of spring-loaded pins configured to physically contact a plurality of integrated circuit contact pads.

8. The portable reader of claim 1, wherein the contact module comprises a plurality of parallel electrically conductive filaments laterally encased in a flexible dielectric material.

9. A portable reader, comprising:
    a reader body, comprising:
        a housing;
        a system board comprising electronic circuitry within the housing; and
        a connector socket attached to the system board; and
    a transparent reader head connected to the reader body and comprising a first side and a second side opposite the first side, the transparent reader head further comprising:
        an outer nose comprising a cavity formed by the outer nose;
        an inner nose positioned within the cavity; and
        a contact module electrically coupled with the electronic circuitry within the housing and configured to establish simultaneous electrical connection to a plurality of contact pads,
    wherein the transparent reader head is configured such that an integrated circuit at the second side of the transparent reader head is visible from the first side of the transparent reader head.

10. The portable reader of claim 9, further comprising a transparent circuit board within the transparent reader head, wherein transparent circuit board comprises circuitry that is electrically coupled to the contact module.

11. The portable reader of claim 10, wherein the transparent reader head further comprises at least one of:
a detector switch configured to activate as the portable reader is positioned near to, or in contact with a surface; and
a light source configured to activate and to direct light onto the surface upon activation of the detector switch.

12. The portable reader of claim 9, further comprising a transceiver configured to transmit data regarding the integrated circuit to an information processing system and/or to receive data from the information processing system for use by the portable reader.

13. The portable reader of claim 9, wherein the contact module comprises a plurality of spring-loaded pins configured to physically contact a plurality of integrated circuit contact pads.

14. The portable reader of claim 9, wherein the contact module comprises a plurality of parallel electrically conductive filaments laterally encased in a flexible dielectric material.

15. A method for performing an operation on an integrated circuit, comprising:
activating a detector switch on a portable reader;
visually detecting the integrated circuit through a transparent head of the portable reader;
aligning a contact module of the transparent head with the integrated circuit while visually detecting the integrated circuit through the transparent head;
electrically coupling the contact module with integrated circuit contact pads; and
performing the operation on the integrated circuit while electrically coupling the contact module with the integrated circuit contact pads.

16. The method of claim 15, further comprising activating a light source to direct light onto the integrated circuit responsive to the activating of the detector switch.

17. The method of claim 15, further comprising transmitting results of the operation to an information processing system using a transceiver positioned on a system board of the portable reader.

18. The method of claim 15, wherein:
the portable reader comprises:
a transparent outer nose comprising a cavity therein; and
a transparent inner nose within the cavity; and
the visually detecting of the integrated circuit through the transparent head further comprises visually detecting the integrated circuit through the transparent outer nose and the transparent inner nose.

19. The method of claim 18, wherein the visually detecting of the integrated circuit through the transparent head of the portable reader further comprises detecting the integrated circuit through a transparent flexible circuit board positioned between, and held in place by, the transparent inner nose and the transparent outer nose.

20. The method of claim 15, further comprising emitting a signal from the portable reader to notify an operator of a status of the operation.

* * * * *